(12) United States Patent
Hu et al.

(10) Patent No.: US 10,469,637 B2
(45) Date of Patent: Nov. 5, 2019

(54) DETACHABLE INTELLIGENT BACK COVER

(71) Applicant: JRD Communication Inc., Shenzhen (CN)

(72) Inventors: Zhiguo Hu, Shenzhen (CN); Dongshui Su, Shenzhen (CN); Huajun Cheng, Shenzhen (CN); Ruilin Hou, Shenzhen (CN); Benzhi Ye, Shenzhen (CN); Xieyuan Lin, Shenzhen (CN)

(73) Assignee: JRD Communication Inc., Shenzhen (CN)

( * ) Notice: Subject to any disclaimer, the term of this patent is extended or adjusted under 35 U.S.C. 154(b) by 0 days.

(21) Appl. No.: 15/744,801

(22) PCT Filed: Mar. 16, 2017

(86) PCT No.: PCT/CN2017/076992
§ 371 (c)(1),
(2) Date: Jan. 14, 2018

(87) PCT Pub. No.: WO2018/137279
PCT Pub. Date: Aug. 2, 2018

(65) Prior Publication Data
US 2019/0007534 A1   Jan. 3, 2019

(30) Foreign Application Priority Data

Jan. 24, 2017 (CN) .......................... 2017 1 0060119

(51) Int. Cl.
*H04M 1/02* (2006.01)
*H01M 2/04* (2006.01)
(Continued)

(52) U.S. Cl.
CPC ....... *H04M 1/0254* (2013.01); *H01M 2/0404* (2013.01); *H04M 1/0279* (2013.01);
(Continued)

(58) Field of Classification Search
CPC ............ H04M 1/0254; H04M 1/0279; H04M 1/72575; H04M 1/03; H04M 1/0262; H04M 1/0277; H04M 1/22; H01M 1/0254
See application file for complete search history.

(56) References Cited

U.S. PATENT DOCUMENTS

2001/0050988 A1* 12/2001 Poulsen .............. H04M 1/0237
379/433.04
2006/0250627 A1* 11/2006 Silverbrook ............. B41J 3/445
358/1.12
(Continued)

FOREIGN PATENT DOCUMENTS

| CN | 102487409 | 6/2012 |
|---|---|---|
| CN | 202841239 | 3/2013 |

(Continued)

*Primary Examiner* — Tuan D Nguyen

(57) ABSTRACT

A detachable intelligent back cover is disclosed and comprises a cover body detachably connected to a middle frame of a casing of an intelligent terminal, a circuit board fixed to an inner surface of the cover body, and a spring probe assembly electrically mounted on a corresponding circuit board and protruding backwardly from the cover body; wherein lighting elements or spare batteries, or speakers are provided on a face of the circuit board toward the cover body. Such that back cover is not only used to protect the batteries, but also to be light sources, signaling lights, spare batteries, speakers, and the like. To use, it is only necessary to install the back cover on the intelligent terminal, in order to be automatically energized via the spring probe assembly. The back covers are selectively changed based on the requirements of users, to improve intelligence of the back cover.

9 Claims, 7 Drawing Sheets

(51) Int. Cl.
*H04M 1/725* (2006.01)
*H04M 1/22* (2006.01)

(52) U.S. Cl.
CPC ...... *H04M 1/72575* (2013.01); *H04M 1/0249* (2013.01); *H04M 1/0277* (2013.01); *H04M 1/22* (2013.01)

(56) References Cited

U.S. PATENT DOCUMENTS

| | | | | |
|---|---|---|---|---|
| 2007/0015554 A1* | 1/2007 | Siddiqui | ................ | H01Q 1/243 455/575.7 |
| 2007/0267497 A1* | 11/2007 | Tracy | ...................... | H04M 1/22 235/454 |
| 2017/0207561 A1* | 7/2017 | Scherer | ................ | H01R 12/721 |

FOREIGN PATENT DOCUMENTS

| | | |
|---|---|---|
| CN | 205847345 | 12/2016 |
| CN | 106303801 | 1/2017 |
| GB | 2379576 | 3/2003 |
| JP | 2008-072728 | 3/2008 |

\* cited by examiner

DETACHABLE INTELLIGENT BACK COVER

RELATED APPLICATIONS

This application is a National Phase of PCT Patent Application No. PCT/CN2017/076992 having International filing date of Mar. 16, 2017, which claims the benefit of priority of Chinese Patent Application No. 201710060119.1 filed on Jan. 24, 2017. The contents of the above applications are all incorporated by reference as if fully set forth herein in their entirety.

FIELD AND BACKGROUND OF THE INVENTION

The present disclosure relates to a technical field of intelligent hardware, and particularly to an intelligent terminal kit, an intelligent terminal, and a detachable intelligent back cover thereof.

Today, intelligentization for mobile phones is increasingly required, which is not only reflected in the software of mobile phones, but is also reflected in the hardware. Throughout the mobile phone industry, back covers of the mobile phones purely act as a protective cover of a battery and the phone, to protect battery and internal components of the phone. Now, the batteries made by many manufacturers are non-replacable. To prevent the battery from being replaced by users, battery back covers designed by such manufacturers are not detachable, resulting in an intelligent possibility of the back covers being further discounted.

SUMMARY OF THE INVENTION

In view of shortcomings of the prior art, an object of the present disclosure is to provide an intelligent terminal kit, an intelligent terminal, and a detachable intelligent back cover, which are able to make the back cover to be intelligentized, by the detachable intelligent back cover configured to be connected to the intelligent terminal, to meet different needs of customers.

In order to achieve the above object, the present disclosure adopts the following technical schemes.

A detachable intelligent back cover comprises a cover body being configured to be detachably connected with a middle frame of a casing of an intelligent terminal; a first circuit board fixed on an inner surface of the cover body; and a spring probe assembly electrically connected to and mounted on the first circuit board, as well as protruding backwardly from the cover body; wherein a plurality of lighting elements are disposed on a face of the first circuit board toward the cover body, with light emitted from the lighting elements passing through a translucent portion at an outer surface of the cover body.

In one of embodiments of the present disclosure, the translucent portion is a plurality of translucent holes set up in the cover body, each of the translucent holes corresponds to one of the lighting elements, respectively.

In one of embodiments of the present disclosure, the detachable intelligent back cover further comprises a light guiding film covering the outer surface of the cover body, and a transparent cover, wherein the light guiding film is spread between the transparent cover and the cover body.

Another object of the present disclosure is to provide another detachable intelligent back cover, the detachable intelligent back cover comprises a cover body being configured to be detachably connected with a middle frame of a casing of an intelligent terminal; a battery cover fixed on the inner surface of the cover body; a second circuit board and a spare battery both disposed in a space formed between the cover body and the battery cover; and a spring probe assembly mounted on the second circuit board and protruding backwardly from the cover body to the battery cover is connected to the spare battery through the second circuit board.

In one of embodiments of the present disclosure, the detachable intelligent back cover further comprises a third circuit board, an indicating light and an indicating light switch; the third circuit board is connected to the second circuit board; the indicating light and the indicating light switch both connected to the third circuit board and are fixed on a rear face of the third circuit board, are protruding from the cover body, to display an electric power capacity of the spare battery and control a conductive status of the indicating light, respectively.

A further object of the present disclosure is to provide yet another detachable intelligent back cover, the detachable intelligent back cover comprises a cover body being configured to be detachably connected with a middle frame of a casing of an intelligent terminal; a speaker cover fixed on an inner surface of the cover body; a third circuit board, a speaker, and a sound chamber cover all disposed in a space formed between the cover body and the speaker cover; and a spring probe assembly mounted on the third circuit board and protruding backwardly from the cover body to the speaker cover; wherein the sound cover has a sound outlet, and forms a sound cavity with the speaker cover; wherein the speaker is fixed at the sound outlet, and a surface of the cover body has a plurality of sound holds; wherein the spring probe assembly is connected to the speaker through the third circuit board.

In one of embodiments of the present disclosure, the detachable intelligent back cover further comprises at least one layer of dust gauze disposed between the sound cavity cover and the cover body.

In one of embodiments of the present disclosure, the detachable intelligent back cover further comprises a bracket rotatably provided on an outer surface of the cover body.

An intelligent terminal is also provided in the present disclosure, the intelligent terminal comprises any one of the aforementioned detachable intelligent back covers.

An intelligent terminal kit is also provided in the present disclosure, the intelligent terminal kit comprises any two of the aforementioned detachable intelligent back covers.

The back covers are designed by the present disclosure, such that back covers are not only used as a protection cover for the battery, but also have functions such as light sources, signal lamps, spare batteries, and speakers. To use, it is only necessary to install the back cover on the intelligent terminal, the back covers are automatically energized via the spring probe assembly, so that the back covers are selectively changed based on actual requirements of users. Thus, it is very effective to improve an intelligentized degree of the back cover.

DESCRIPTION OF SPECIFIC EMBODIMENTS OF THE INVENTION

The present disclosure will be described in further detail with reference to the accompanying drawings and embodiments, in which the objects, technologies, and advantages of the present disclosure will become more apparent from the following description. It is to be understood that the specific embodiments described herein are merely illustrative of the present disclosure, and are not intended to limit the present disclosure.

The detachable intelligent back cover of the present disclosure has a cover body configured to be detachably connected to a back portion of the intelligent terminal to serve as a battery cover, a circuit board fixed to an inner surface of the cover body, and a spring probe assembly electrically connected to and mounted on a corresponding circuit board, as well as protruding backwardly from the cover body. A plurality of lighting elements, spare batteries or speakers are provided on a face of the circuit board toward the cover body, while the cover body is provided with a side key, a headphone hole, a camera hole, a flash light hole, and the like. Detachable connections include, but are not limited to, snap connections, screw connections, etc., such that the back cover is not only used as a battery protection cover, but also has functions such as light sources, signal lights, spare batteries, speakers, and the like. To use, it is only necessary to install the back cover on the intelligent terminal, in order for the back cover to be automatically energized via the spring probe assembly. The back cover is selectively switched based on the requirements of the user, to substantially increase an intelligentized degree of the back cover. The intelligent terminals herein include, but are not limited to, smartphones, tablets, cameras, and the like.

Embodiment 1

Referring to FIGS. 1 to 4, the detachable intelligent back cover in the present disclosure comprises a cover body 10 configured to be detachably connected to a middle frame of a casing of an intelligent terminal; a first circuit board 20 fixed to an inner surface of the cover body 10; and a spring probe assembly 30 electrically connected to and mounted on the first circuit board 20, as well as protruding backwardly from the cover body 10. A plurality of lighting elements 201 are disposed on a face of the first circuit board 20 toward the cover body 10, with light emitted from the lighting elements 201 passing through a translucent portion of an outer surface of the cover body. In this embodiment, the lighting elements are light emitting diodes (LEDs).

Specifically, in use, it is only necessary to replace the original battery cover with the detachable intelligent back cover to install in the back of the intelligent terminal, then the spring probe assembly 30 on the inner surface of the intelligent back cover is able to electrically conduct with corresponding contacts on the back portion of the intelligent terminal. Thereby, lighting is achieved by the intelligent back cover.

Figure 1:
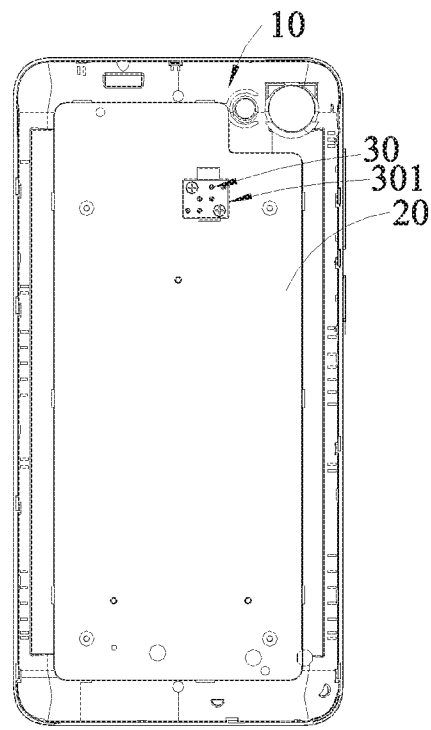
FIG. 1 illustrates a front view of an intelligent back cover, according to a first embodiment of the present disclosure.
Figure 2:
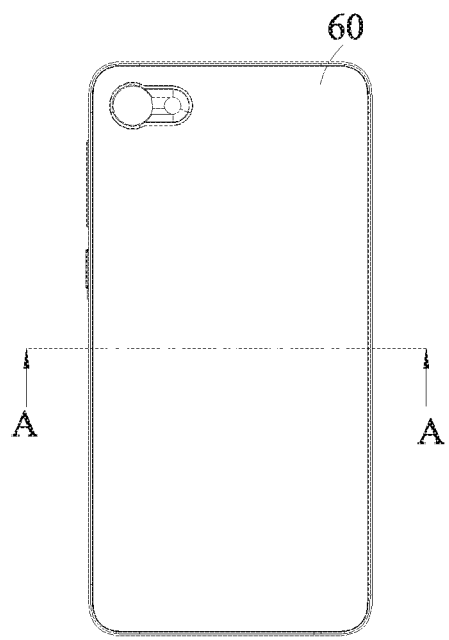
FIG. 2 illustrates a rear view of an intelligent back cover, according to the first embodiment of the present disclosure.
Figure 3:
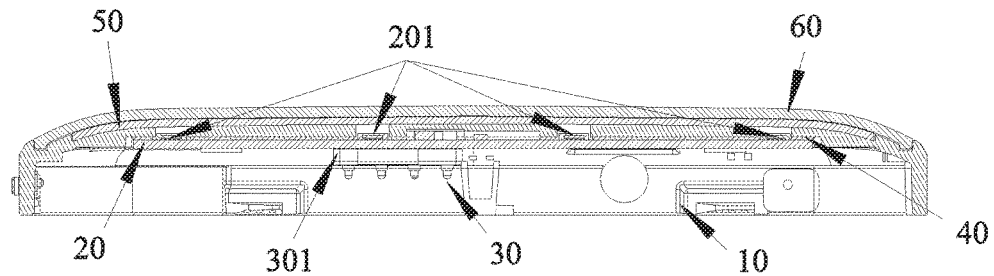
FIG. 3 illustrates a cross-sectional view taken along a line A-A of FIG. 2.
Figure 4:
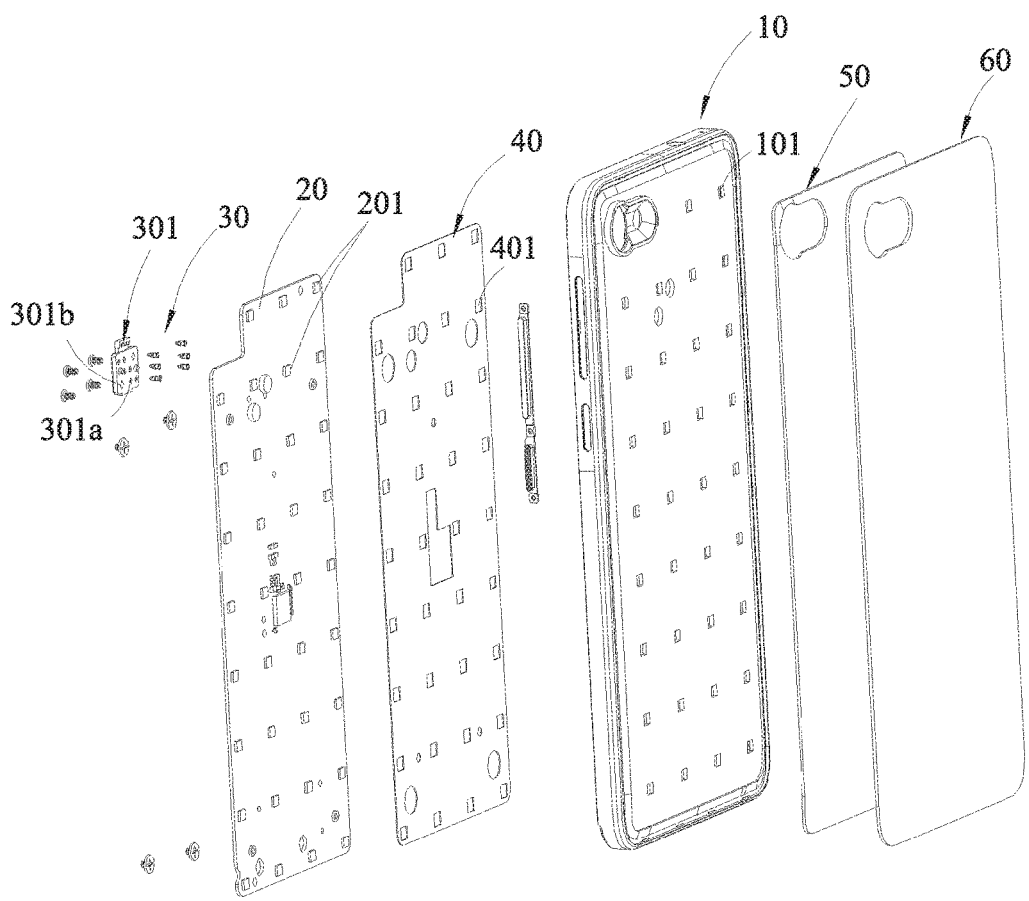
FIG. 4 illustrates a schematic diagram of an exploded view of an intelligent back cover according to the first embodiment of the present disclosure.

As shown in FIGS. 3 and 4, the spring probe assembly 30 comprises a plurality of spring probes (POGO PIN) with two ends, one end is fixed to the first circuit board 20 and the other end partially protrudes by passed through a probe limiter 301. The probe limiter 301 has pinholes 301a to be passed through by the spring probes, and screw holes 301b to be passed through by screws (not shown in figure), in order to fix the probe limiter 301 on the screw holes 301b of the first circuit board 20.

In this embodiment, the translucent portion is a plurality of translucent holes 101 set up in the cover body 10, with each of the translucent holes 101 respectively corresponding to one of the lighting elements 201. The outer surface of the cover body 10 is also covered with a light guiding film 50 and a transparent cover 60, wherein the light guiding film 50 is spread between the transparent cover 60 and the cover body 10, with light emitted through the translucent holes 101 being homogenized, display is improved. In other embodiments, the cover body 10 may also be designed to be a structure with a transparent bottom, and the translucent portion is located at a bottom face of the cover body 10.

The lighting elements 201 are provided in an array form on the first circuit board 20, and the translucent holes 101 are provided in an array form on the cover body 10. The lighting elements 201 are uniformly distributed over the entire first circuit board 20, and the translucent holes 101 are uniformly distributed over the entire cover body 10. Thus, the entire intelligent back cover presents a light-emitting effect after being powered-on. In addition, A first intermediate layer 40 is also provided between the first circuit board 20 and the cover body 10, with a surface of the first intermediate layer 40 having avoidance holes 401 used for passed through by the lighting elements 201. The first intermediate layer 40 is preferably foam, which can simultaneously serve as a cushion and as an insulation.

Embodiment 2

Figure 5:
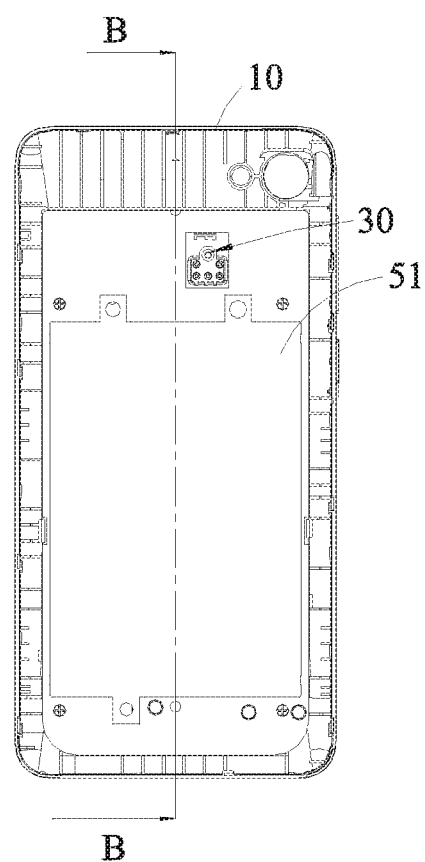
FIG. 5 illustrates a rear view of an intelligent back cover, according to a second embodiment of the present disclosure.
Figure 6:
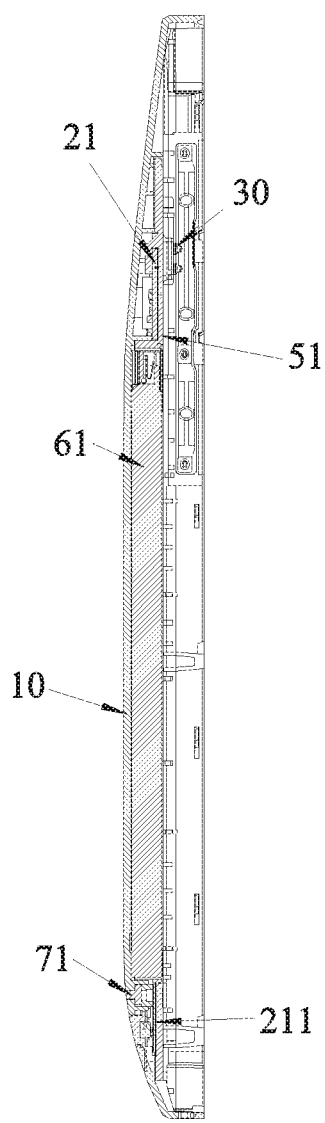
FIG. 6 illustrates a cross-sectional view taken along a line B-B in FIG. 5.
Figure 7:
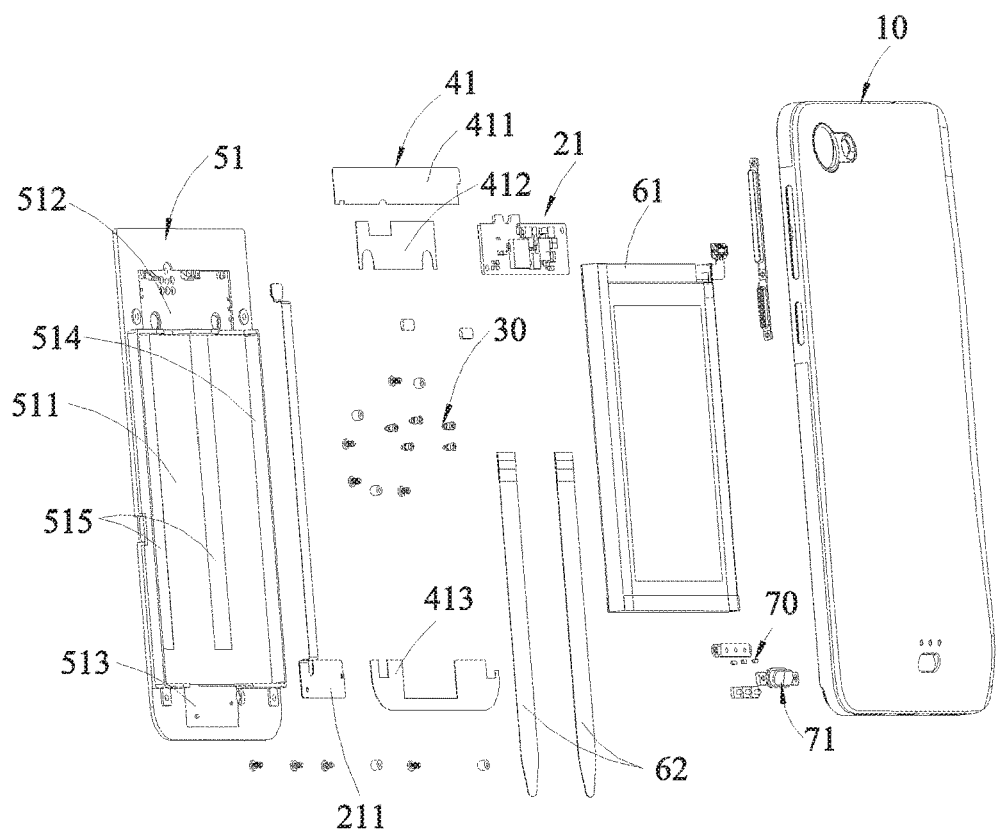
FIG. 7 illustrates a schematic diagram of an exploded view of an intelligent back cover, according to the second embodiment of the present disclosure.

Referring to FIGS. 5 to 7, another detachable intelligent back cover with a different function is shown. The detachable intelligent back cover comprises a cover body 10 configured to be detachably connected with a middle frame of a casing of an intelligent terminal; a battery cover 51 fixed on the inner surface of the cover body 10; a second circuit board 21, and a spare battery 61 both disposed in a space formed between the cover body 10 and the battery cover 51; and a spring probe assembly 30 mounted on the second circuit board 21 and protruding backwardly from the cover body 10 to the battery cover 30, is connected to the spare battery 61 through the second circuit board 21.

In addition, the detachable intelligent back cover of the present embodiment further has a third circuit board 211, an indicator light 70, and an indicator light switch 71. The third circuit board 211 is electrically connected to the second circuit board 21. The indicating light 70 and the indicating light switch 71 are both connected to the third circuit board 211 and fixed on a rear face of the third circuit board 211, and are protruding from the cover body 10, to display an electric power capacity of the spare battery 61 and control a conductive status of the indicating light 70, respectively.

Specifically, a second intermediate layer 41 and two battery tear tapes 62 are provided in the space formed between the cover body 10 and the battery cover 51. The second intermediate layer 41 comprises a foam 411, two adhesive layers 412 and 413, with the adhesive layers 412 and 413 used for pasting the second circuit board 21 and the third circuit board 211 on a rear face of the battery cover 51. The foam 411 is provided between the second circuit board 21 and the cover body 10, and serves as to have effects of a cushion and an insulation. The battery tear tapes 62 are used to paste on a side of the spare battery 61, and extend to the other side of the spare battery 61, with the battery tear tapes 62 exposing a tearing portion, in order to facilitate detachment of the spare battery 61.

In this embodiment, the third circuit board 211 is a flexible circuit board (FPC). A side of the battery cover 51 toward the cover body 10 is provided with a battery accommodating slot 511, a first mounting slot 512, a second mounting slot 513, a third mounting slot 514, and two fourth mounting slots 515. The first mounting slot 512 and the second mounting slot 513 are provided at the upper and lower sides of the battery accommodating slot 511, respectively. The first mounting slot 512 and the second mounting slot 513 provide mounting positions for installing the second circuit board 21 and the third circuit board 211, respectively. The third mounting slot 514 is located at the left side or right side of the battery accommodating slot 511. The third mounting slot 514 provides a wire slot for a wiring along a direction from top to down of the third circuit board 211. The two fourth mounting slots 515 are spaced apart in the battery accommodating slot 511, and are used to accommodate the two battery tear tapes 62. The second circuit board 21, the third circuit board 211, and the battery tear tapes 62 are embedded in the battery cover 51. Thereby, the intelligent back cover has a compact structure and a high space utilization. After the battery cover 51 is fixed to the inner surface of the cover body 10, such structures between the battery cover 51 and the cover body 10 are hidden inside and invisible, and only the battery cover 51 and the spring probe assembly 30 protruding from the battery cover 51 are visible outside of the battery cover 51.

The intelligent back cover of the present embodiment may be installed in the same manner as the first embodiment. After the intelligent back cover is installed in the intelligent terminal, the back cover can be used as a mobile power source, and provided with a spare energy to the intelligent terminal with a built-in battery.

Embodiment 3

Figure 8:
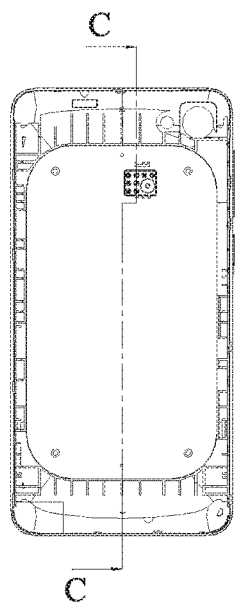
FIG. 8 illustrates a front view of an intelligent back cover, according to a third embodiment of the present disclosure.
Figure 9:
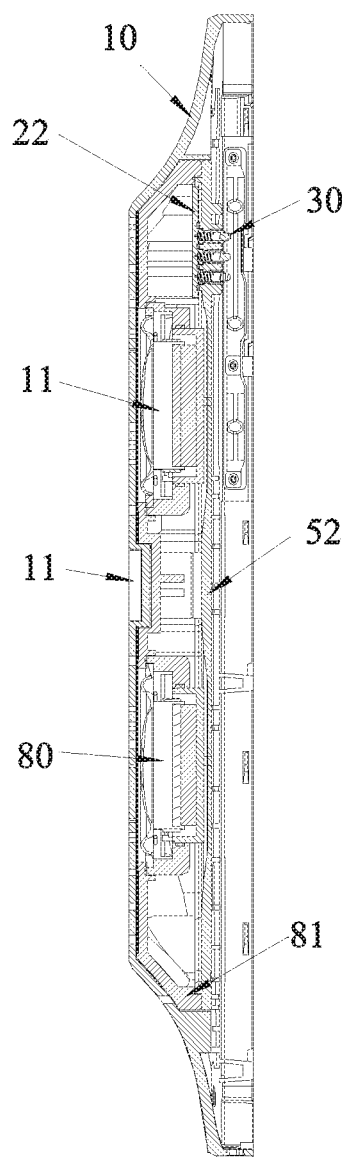
FIG. 9 illustrates a cross-sectional view taken along a line C-C in FIG. 8.
Figure 10:
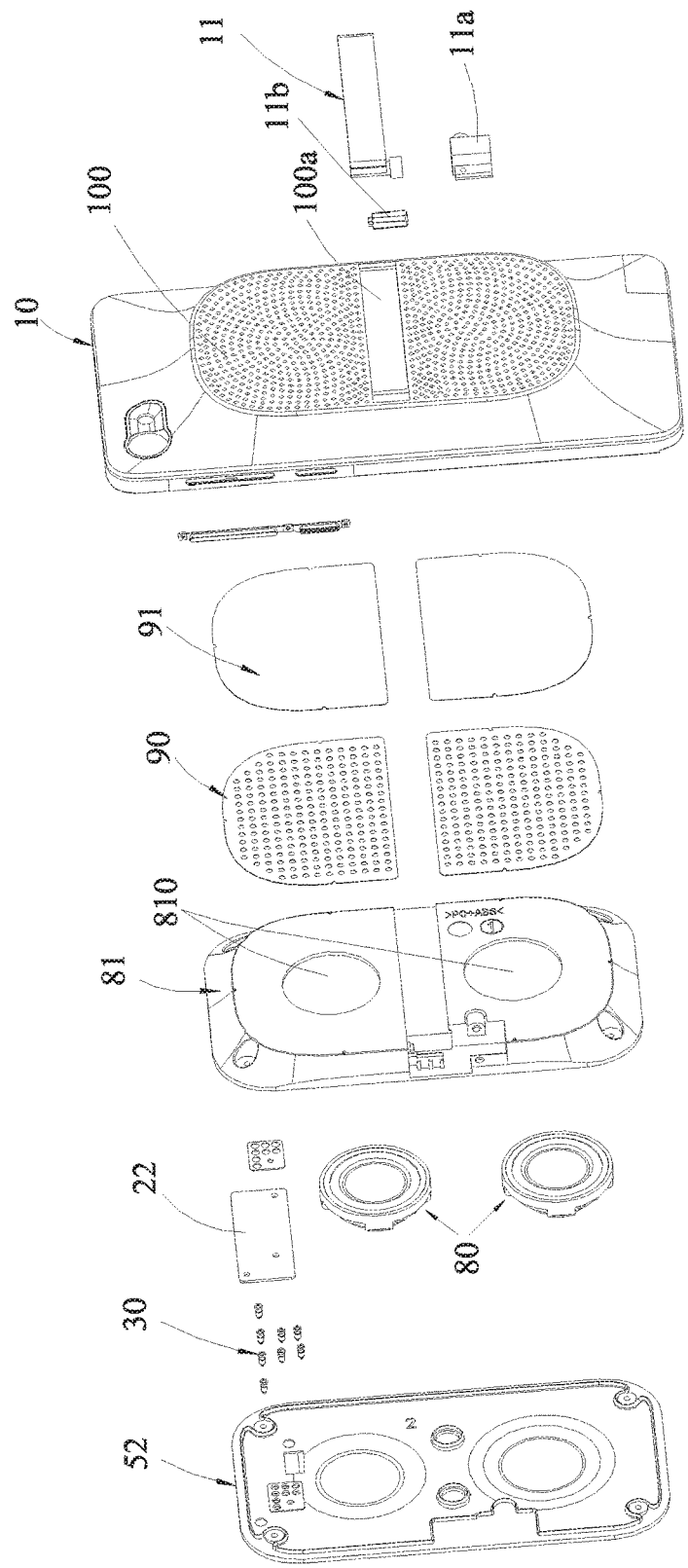
FIG. 10 illustrates a schematic diagram of an exploded view of an intelligent back cover, according to the third embodiment of the present disclosure.

As shown in FIGS. 8 to 10, unlike the above embodiments, the detachable intelligent back cover of the present embodiment can be used as a modular external speaker, the detachable intelligent back cover comprises a cover body 10 being configured to be detachably connected with a middle frame of a casing of an intelligent terminal, a speaker cover 52 fixed on the inner surface of the cover body 10; a third circuit board 22, a speaker 80, and a sound chamber cover 81 all disposed in a space formed between the cover body 10 and the speaker cover 52, and a spring probe assembly 30 mounted on the third circuit board 22 and protruding backwardly from the cover body 10 to the speaker cover 52. The sound chamber cover 81 has a sound outlet 810, and forming a sound cavity with the speaker cover 52. The speaker 80 is fixed at the sound outlet 810. A surface of the cover body 10 has a plurality of sound holes 100. The spring probe assembly 30 is connected to the speaker 80 through the third circuit board 22.

After the intelligent back cover is installed to the intelligent terminal, the spring probe assembly 30 on an inner surface of the intelligent back cover is able to electrically conduct with corresponding contacts on a back portion of the intelligent terminal, so as to use as an external speaker which has a sound effect much higher than the sound effect of the intelligent terminal with built-in small speakers.

As shown in FIGS. 9 and 10, the intelligent back cover also comprises at least one layer of dust gauze disposed between the sound chamber cover 81 and the cover body 10. The dust gauze of the present embodiment comprises a metal dust filter 90 and a nylon dust filter 91, which are successively provided outside the sound cavity cover 81. The dust filter 91 can further enhance a dust-proofing and prevent dust from passing through the metal dust filter 90 and entering the sound cavity.

The present embodiment has two speakers which are symmetrically arranged, so as to improve the sound quality as well. Accordingly, the sound cavity cover 81 has two outlets 810 which are symmetrically arranged, as well as the cover body 10 is provided with two corresponding sound emitting regions, each of the sound emitting regions is provided in an array form with some sound holes 100.

In addition, a bracket 11 is rotatably provided on the outer surface of the cover body 10, in order to facilitate for supporting the intelligent terminal and generating sound. A rotation axis of the bracket 11 is parallel to a longitudinal direction of the cover body 10, the bracket 11 is located between the two sound emitting regions. Specifically, a shaft hole and a bracket accommodation groove 100a are interconnected and provided between the two sound emitting regions of the cover body 10. The bracket 11 has one end with a through hole for passing through a rotating shaft. A hollow rotary sleeve 11a is fitted into the rotary shaft hole, a rotation shaft 11b is inserted in the through hole of the bracket 11 and fixed in the rotary sleeve 11a. Thus, a rotation connection between the bracket 11 and the cover body 10 is completed. After the bracket 11 is stretched, the intelligent terminal has better sound.

It is to be understood that cover body 10 having a plurality of different functions in the battery cover are used to assemble to mounting buckles, insertion members and parting surfaces of the intelligent terminal. In addition, components such as ribs and the like of the intelligent terminal are made the same. Thus, a plurality of detachable intelligent back cover and intelligent terminals without a battery cover are composed of an intelligent terminal kit. Differential functions are integrated through different forms of the Pogo pin connection, to achieve an intelligentization and a diversity of the back cover with high utility value.

In view of the above, according to the present disclosure, the back covers are designed such that the back covers are not only used as a battery cover, but also have functions such as light sources, signal lights, spare batteries, speakers, and the like. If the back covers are required to use, it is only necessary to install the back covers to the intelligent terminal, so as to automatically energized via the spring probe assembly. The back covers are selectively switched based on the requirements of the user, to improve effectively an intelligentized degree of the back covers.

It is to be understood that it will be apparent to those skilled in the art that certain modifications and modifications may be made without departing from the principles of the present application and that such improvements and modifications shall be regarded as the scope of protection of the present application.

What is claimed is:

1. A detachable intelligent back cover, comprising:
a cover body for detachably connecting with a middle frame of a casing of an intelligent terminal;
a first circuit board having a first surface of the first circuit board fixed to an inner surface of the cover body; and
a spring probe assembly electrically connected to and mounted on a second surface of the first circuit board, wherein the spring probe assembly comprises a plurality of spring probes each with two ends, one of the two ends protruding partly through a probe limiter in a direction away from the second surface of the first circuit board, the other of the two ends being fixed to the second surface of the first circuit board which is facing away from the inner surface of the cover body; and
a plurality of lighting elements disposed on the first surface of the first circuit board toward the inner surface of the cover body such that light emitted from the lighting elements passes through a translucent portion of an outer surface of the cover body;
wherein the plurality of lighting elements form a two-dimensional array of lighting elements evenly distributed on the first surface of the first circuit board, the plurality of spring probes form a two-dimensional array of spring probes, and the cover body has a reciprocal planar structure to receive two-dimensional array of lighting elements and the first circuit board.

2. The detachable intelligent back cover as claimed in claim 1, wherein the translucent portion is a plurality of translucent holes positioned in the cover body in the detachable intelligent back cover, each of the translucent holes corresponding to one of the lighting elements.

3. The detachable intelligent back cover as claimed in claim 2, further comprising a light guiding film covering the outer surface of the cover body, and a transparent cover, wherein the light guiding film is spread between the transparent cover and the cover body.

4. A detachable intelligent back cover, comprising:
a cover body detachably connected with a middle frame of a casing of an intelligent terminal;
a first circuit board fixed to an inner surface of the cover body, wherein a plurality of lighting elements are disposed on a face of the first circuit board toward the cover body, such that light emitted from the lighting elements passes through a translucent portion of an outer surface of the cover body, a first spring probe assembly is electrically connected to and mounted on the first circuit board, and the first spring probe is assembly protruding backwardly from the cover body;
a battery cover fixed to the inner surface of the cover body, wherein a second circuit board and a spare battery both disposed in a space formed between the cover body and the battery cover, a second spring probe assembly is mounted on the second circuit board and protruding backwardly from the cover body to the battery cover, and the second spring probe assembly is connected to the spare battery through the second circuit board; and
a speaker cover fixed to the inner surface of the cover body, wherein a third circuit board, a speaker, and a sound cavity cover are all disposed in a space formed between the cover body and the speaker cover, the sound cavity cover has a sound outlet and forms a sound cavity with the speaker cover, the speaker is fixed at the sound outlet, the cover body has a plurality of sound holds, a third spring probe assembly is mounted on the third circuit board and protruding backwardly from the cover body to the speaker cover, and the third spring probe assembly is connected to the speaker through the third circuit board.

5. The detachable intelligent back cover as claimed in claim 4, wherein the translucent portion is a plurality of translucent holes positioned in the cover body in the detachable intelligent back cover, each of the translucent holes corresponding to one of the lighting elements.

6. The detachable intelligent back cover as claimed in claim 4, further comprising a light guiding film covering the outer surface of the cover body, and a transparent cover, wherein the light guiding film is spread between the transparent cover and the cover body.

7. The detachable intelligent back cover as claimed in claim 4, further comprising an indicating light and an indicating light switch; wherein the third circuit board is connected to the second circuit board; and wherein the indicating light and the indicating light switch are both connected to the third circuit board, both fixed on a rear face of the third circuit board, and both protrude from the cover body, the indicating light displays an electric power capacity of the spare battery, and the indicating light switch controls a conductive status of the indicating light.

8. The detachable intelligent back cover as claimed in claim 4, further comprising at least one layer of dust gauze disposed between the sound cavity cover and the cover body.

9. The detachable intelligent back cover as claimed in claim 4, further comprising a bracket rotatably provided on the outer surface of the cover body.

* * * * *